United States Patent
Ringler (10) Patent No.: US 8,387,813 B2
(45) Date of Patent: Mar. 5, 2013

(54) "FISH CRATE" COLLAPSIBLE CONTAINER FOR TRANSPORTING FRESH FISH (75) Inventor: Werner Ringler, Weisendorf (DE)

(73) Assignee: IFCO Systems GmbH, Pullach (DE)

( * ) Notice: Subject to any disclaimer, the term of this patent is extended or adjusted under 35 U.S.C. 154(b) by 402 days.

(21) Appl. No.: 12/364,663

(22) Filed: Feb. 3, 2009

(65) Prior Publication Data
US 2009/0194530 A1 Aug. 6, 2009

(30) Foreign Application Priority Data

Feb. 4, 2008 (DE) .......................... 10 2008 007 340
Mar. 26, 2008 (EP) ...................................... 08153329

(51) Int. Cl.
*B65D 6/00* (2006.01)
*B65D 8/14* (2006.01)
(52) U.S. Cl. ........................................................... 220/6
(58) Field of Classification Search .................. 220/6, 7, 220/4.28
See application file for complete search history.

(56) References Cited

U.S. PATENT DOCUMENTS

| | | | |
|---|---|---|---|
| 3,360,180 A | 12/1967 | Venturi | |
| 3,841,519 A | 10/1974 | Strömberg | |
| 4,044,910 A | 8/1977 | Box | |
| 4,118,265 A | 10/1978 | Hardigg | |
| 4,674,647 A * | 6/1987 | Gyenge et al. | 220/6 |
| 5,429,236 A * | 7/1995 | Evans | 206/386 |
| 5,671,862 A * | 9/1997 | Cobos | 220/622 |
| 5,704,193 A | 1/1998 | Roe et al. | |
| 7,011,225 B2 | 3/2006 | Oster et al. | |
| 7,104,414 B2 | 9/2006 | Apps et al. | |
| 7,178,311 B2 | 2/2007 | Hoogland | |
| 2002/0070215 A1 | 6/2002 | Walsh et al. | |
| 2002/0179601 A1 | 12/2002 | Haruhiro | |
| 2008/0169285 A1* | 7/2008 | Marazita et al. | 220/7 |

FOREIGN PATENT DOCUMENTS

| | | |
|---|---|---|
| DE | 1221958 B | 7/1966 |
| DE | 1586649 B | 12/1970 |
| DE | 2 312 871 | 10/1973 |
| DE | 4231200 C1 | 12/1993 |
| DE | 4424542 A1 | 1/1996 |

(Continued)

OTHER PUBLICATIONS

Official communication issued in counterpart German Application No. 10 2008 007 340.7, mailed on Apr. 24, 2008.

(Continued)

*Primary Examiner* — Harry Grosso
(74) *Attorney, Agent, or Firm* — Keating & Bennett, LLP (57) ABSTRACT

The invention is a collapsible container for transporting fresh fish or the like, in particular ice-cooled goods or foodstuffs. This "fish crate" is essentially manufactured by means of plastic injection molding, i.e. by injection-molding the side walls and the base of the collapsible container using an injection-molding tool. In particular the four side walls are implemented to be double-walled, a closed air cushion being created by welding on a footing after the injection molding process. In the area of the slightly tray-shaped base, openings for the passage of liquid are provided; in particular, the melt water of the ice-cooled fresh fish is to be drained off to the outside. Besides these base openings, further additional openings which join the base and the side walls in a foldable manner may be provided in the area of the hinges.

13 Claims, 8 Drawing Sheets

FOREIGN PATENT DOCUMENTS

| | | |
|---|---|---|
| DE | 29907229 U1 | 11/1999 |
| DE | 10137328 A1 | 2/2003 |
| DE | 20311478 U1 | 7/2003 |
| DE | 10 2004 032 422 A1 | 2/2005 |
| DE | 602 05 881 T2 | 6/2006 |
| DE | 10137328 B4 | 8/2007 |
| EP | 0 071 467 A2 | 2/1983 |
| EP | 0 603 531 A1 | 6/1994 |
| EP | 0 931 727 A2 | 7/1999 |
| GB | 1 202 142 | 1/1968 |
| JP | 51-017887 A | 2/1976 |
| JP | 63-082941 A | 4/1988 |
| JP | 08-113237 A | 5/1996 |
| JP | 11-020864 A | 1/1999 |
| JP | 2001-122252 A | 5/2001 |
| JP | 2003-165535 A | 6/2003 |
| JP | 2003-335328 A | 11/2003 |
| JP | 2005-219219 A | 8/2005 |
| JP | 2007-331793 A | 12/2007 |
| WO | 90/12738 A1 | 11/1990 |
| WO | 93/24378 A1 | 12/1993 |
| WO | 98/30454 A1 | 7/1998 |

OTHER PUBLICATIONS

Official communication issued in counterpart European Application No. 08153329.1, mailed on Oct. 13, 2008.

Official Communication issued in corresponding Japanese Patent Application No. 2009-023228, mailed on Aug. 16, 2011.

Official Communication issued in corresponding Canadian Patent Application No. 2,652,196, mailed on Jan. 27, 2012.

\* cited by examiner

"FISH CRATE" COLLAPSIBLE CONTAINER FOR TRANSPORTING FRESH FISH

CROSS-REFERENCE TO RELATED APPLICATIONS

This application claims priority from German Patent Application No. 102008007340.7, which was filed on Feb. 4, 2008, and from European Patent Application No. 08153329.1, which was filed on Mar. 26, 2008, both of which are incorporated herein in their entirety by reference.

BACKGROUND OF THE INVENTION

The invention relates to a collapsible container for transporting fresh fish or similar ice-cooled goods, the collapsible container being manufactured essentially by plastic injection molding of side walls and a base. It further relates to a tool for producing such a collapsible container, particularly to injection mold for manufacturing a collapsible container for transporting fresh fish or similar ice-cooled goods, the collapsible container being manufactured essentially by plastic injection molding of side walls and a base.

For freighting fresh salt-water fish or other ice-cooled foodstuffs, it has so far been common to pack the goods—covered in ice—in polystyrene crates and to then transport the crates stacked onto pallets. Even though polystyrene is light in weight and a good thermal insulator, this material has a great drawback. After transport, polystyrene cannot be cleaned sufficiently, i.e. if the rinsing with water is too weak, unhygienic residues will remain on the packaging, and if the rinsing with water is too strong, the material will be damaged. For hygienic reasons, polystyrene is therefore considered only for disposable containers.

SUMMARY

An embodiment may include a collapsible container for transporting fresh fish or similar ice-cooled goods, the collapsible container being manufactured essentially by plastic injection molding of side walls and a base, wherein the side walls and/or the base include a double-walled implementation including a closed air cushion, and wherein openings for the passage of liquid are provided in the base area.

Another embodiment may include an injection mold for manufacturing a collapsible container for transporting fresh fish or similar ice-cooled goods, the collapsible container being manufactured essentially by plastic injection molding of side walls and a base, wherein the side walls and/or the base include a double-walled implementation including a closed air cushion, and wherein openings for the passage of liquid are provided in the base area—or for manufacturing a major part of this collapsible container—by means of plastic injection molding, the double-walled implementation being produced by an injection-molding core.

The invented collapsible container has the basic advantage that, after transport, it can be cleaned of fish scraps in such a manner that it will be available, in perfect hygienic condition, for a new transport as a reusable container. In order to simplify return transport as an empty and to complete the logistic cycle of reusable containers in a cost-efficient manner, the container can be collapsed. Such collapsible crates are well-known, per se, in various implementations, but not in an implementation suited for transporting fresh ice-cooled foodstuffs. To achieve thermal insulation similar to the heat transfer in the known polystyrene material, at least the side walls of the collapsible container are configured to be double-walled. This involves trapping the air layer or the air cushion between the two walls by a welded-on footing. In addition, specific openings are provided in the floor area for discharging the melting ice water.

Plastic containers are already known from reference DE 602 05 881 T2. These are advantageously collapsible trays or collapsible crates, but non-collapsible trays may also be used according to said reference. The collapsible containers enable transporting bulk goods, while returning and storing the empty containers takes up only little space. The transported goods are, for example, perishable goods such as foodstuffs, a packaging of French fries in a frozen state being given special emphasis in accordance with said reference.

As the container material, injection-molding plastic is provided, i.e. a material suited as a reusable material since it can be cleaned in a cleaning station, for example using vapor. It is also suitable as a recycling material.

The end walls and the side walls of the known container comprise closed wall sections. The interspaces between the side-wall portions are advantageously also closed. With these vertical seams, a self-aligning closing connection is advantageously provided which has a pin; other coupling means for mutually coupling the side walls and the end walls may be provided, but are not explained.

As the connection of the end walls and the side walls to the base, lip-like film hinges are advantageous, i.e. assembling and separating the wall and floor elements is to be avoided in accordance with the object. Film hinges other than the above are mentioned only in general terms in said reference.

The upper edge of each collapsible tray may have a foil sealed, glued or welded onto it. The foil is advantageously gastight and liquid-tight, just like the entire collapsible tray is to be gastight and liquid-tight.

The following is not mentioned or taken into account in the technical teaching of DE 602 05 881 T2:
- a double-walled, thermally insulating implementation of the wall sections,
- any openings to allow for melting of cooling ice and discharging of melted liquid to the outside, and
- a stackable implementation of the collapsible crates so as to be able to stack several transport containers on top of one another even when they are covered with the foil.

From the German published specification DE 1 221 958 B, a collapsible crate is additionally known which comprises walls which may be folded down onto the base and having a hinged lid. The known collapsible crate may be collapsed in a space-saving manner when not in use, in particular when being returned as an empty. The crate may consist of plastic, the pivotable parts of the crate integrally merging into one another by means of film hinges which are known per se.

The free top edges of the side walls may be angled to the outside and downward so as to form strip-shaped hollow girders. Also, the side walls are neither double-walled nor closed, but comprise openings which are located high up, for aeration and in order to save material.

The side and end walls intermesh, in an upright orientation, with U-shaped angled surfaces. As the last member of the erection process, one of these walls is folded upward and closes the corner joints. Locks are not provided; rather, as an additional safeguard, the lid overlaps the free upper edges of the side walls of the crate. Strips which protrude upward over the top of the lid and are mounted on the lid form a detent for a further box stacked upon the first box. In said reference, the stackability is set up in a complicated manner because of a divided lid. Not only do the strips which belong to the lid form the detent for the stacked-up crate, but the divided lid also comprises upright lugs which may dip into the ribs of the crate base which is stacked up in each case.

This technical teaching lacks the following features:
no mutual interlocking of side and end walls, instead reliance on the lid for safeguarding
double-walled implementation as a hollow-girder strip only in the topmost area and only for reasons concerning the bearing strength, not for thermal insulation
side walls not closed and not insulating
no draining openings in the base area
no stackability without the lid.

The following further said references do not come any closer to the invention either:
WO 98/30454 A1 shows a similar collapsible container comprising a lid.
WO 93/24378 A1 and U.S. Pat. No. 3,360,180 A show similar collapsible containers without a lid.
U.S. Pat. No. 5,704,193 A shows a similar design of a collapsible container, but made of cardboard.
A locking in accordance with reference DE 101 37 328 B4 relates to the known liftlock closure in accordance with subclaim 7.
Reference DE 10 2004 032 422 A1 relates to a known cover foil as claimed in subclaim 9.

BRIEF DESCRIPTION OF THE DRAWINGS

Embodiments of the present invention will be detailed subsequently referring to the appended drawings, in which.

DETAILED DESCRIPTION OF THE INVENTION

The base 1 of the fish crate collapsible container is implemented to be slightly tray-shaped, i.e. the base plate 35 is drawn slightly upward both for the long side walls 3 and the short side walls 5. This shoulder 3a, 5a for the hinges 3b, 5b of the side walls 3, 5 is drawn slightly further upward for the long side walls 3 than for the short side walls 5, since the short side walls 5 are folded inward first, namely directly onto the base plate 1, and the long side walls 3 are subsequently folded inward, namely onto the short side walls 5.

Figure 1:
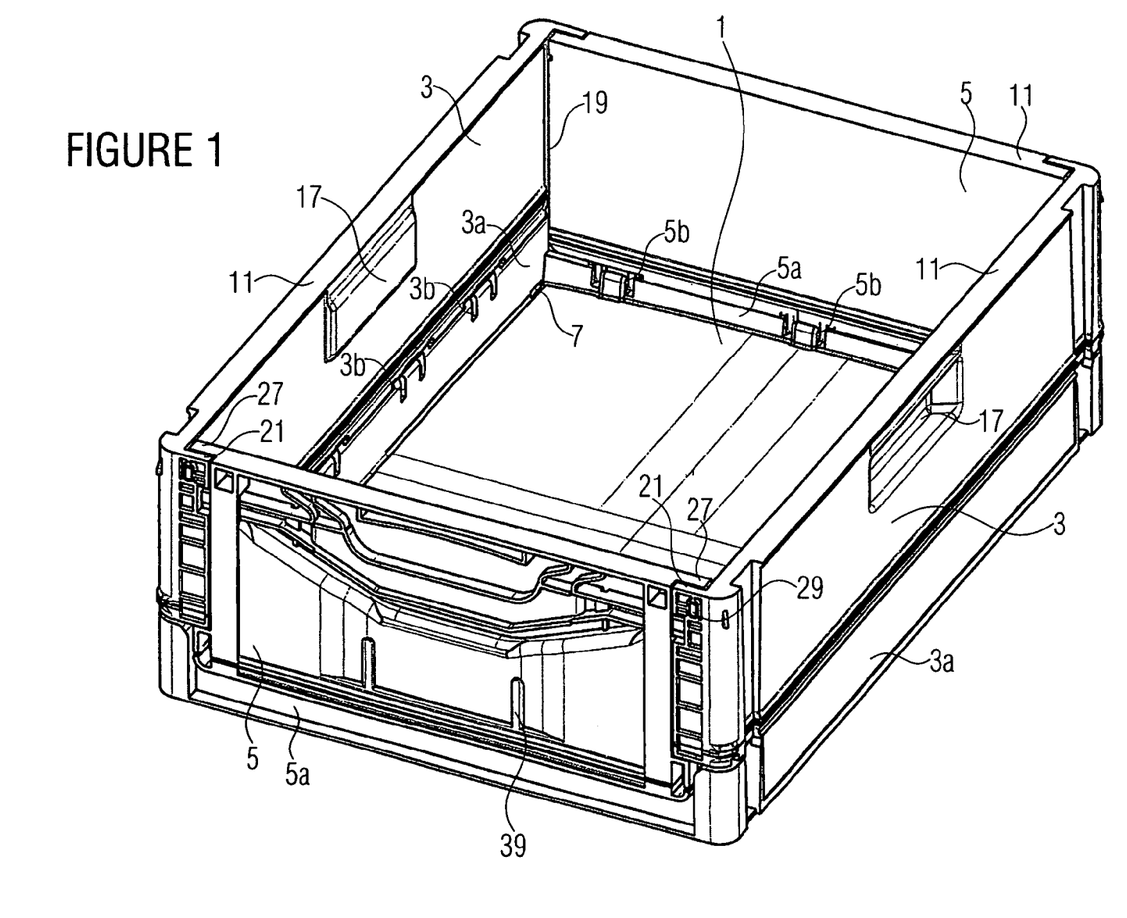
FIG. 1 shows an embodiment of the fish crate in a perspective view.
Figure 2:
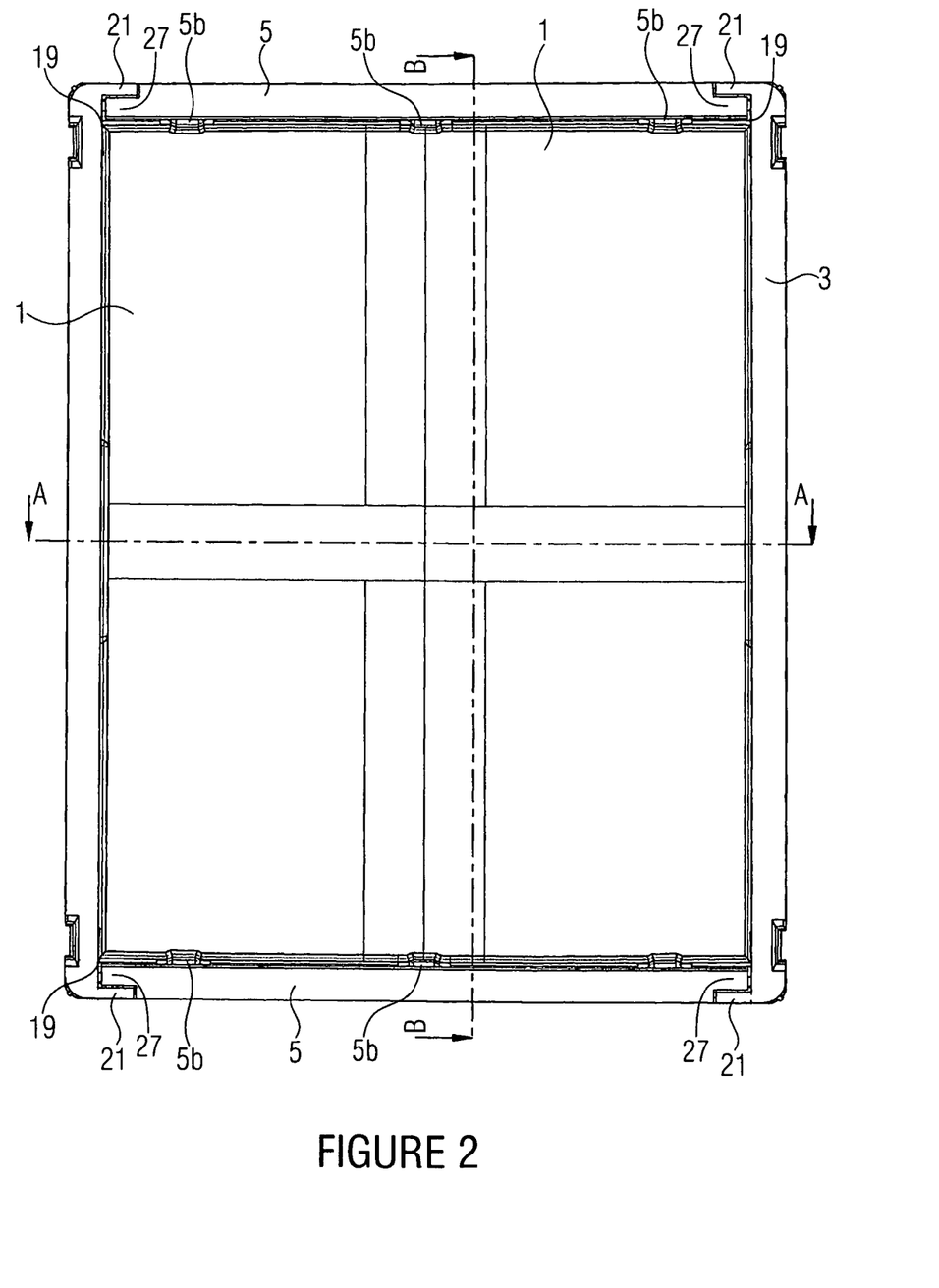
FIG. 2 shows a plan view of the embodiment of the fish crate in accordance with FIG. 1.
Figure 3:
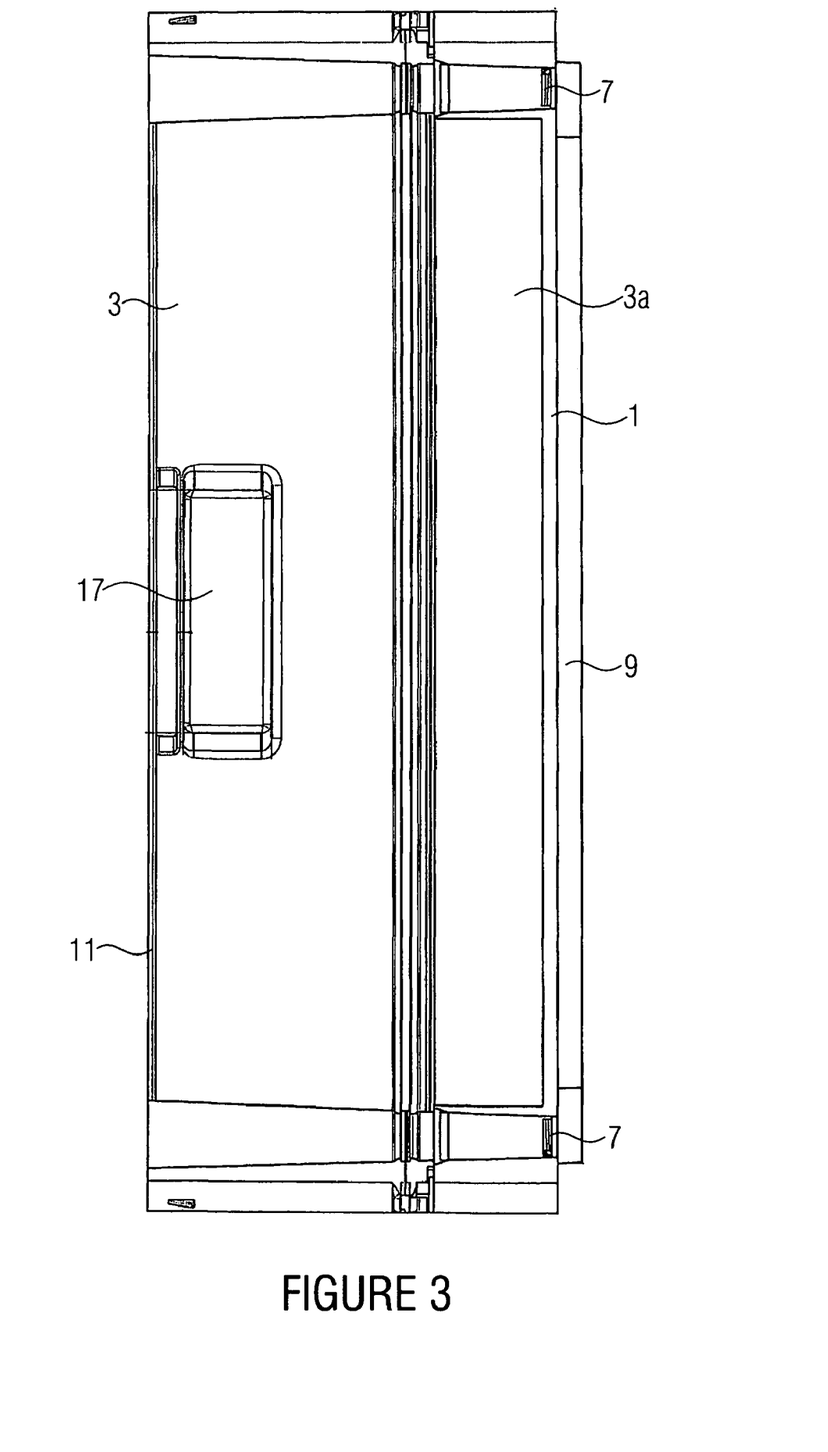
FIG. 3 shows a side view of the longitudinal side of the fish crate in accordance with FIG. 1.

The resulting base tray 1 has four openings 7 sunk into it at the four corners, said openings 7 having the property of draining off to the outside any liquid which has accumulated in the area of the base tray (best to be seen in FIG. 3). These liquids may be organic liquid of the foodstuff transported, but in particular melt water resulting from the ice cooling for the foodstuff. In practice, it will be a mixture of such liquids.

With specific products such as meat, for example, it may be useful to temporarily close off the discharge openings 7 by means of stoppers and plugs so as to temporarily prevent any dripping to the outside. The stoppers may be configured as rubber stoppers included in the delivery, for example.

Figure 4:
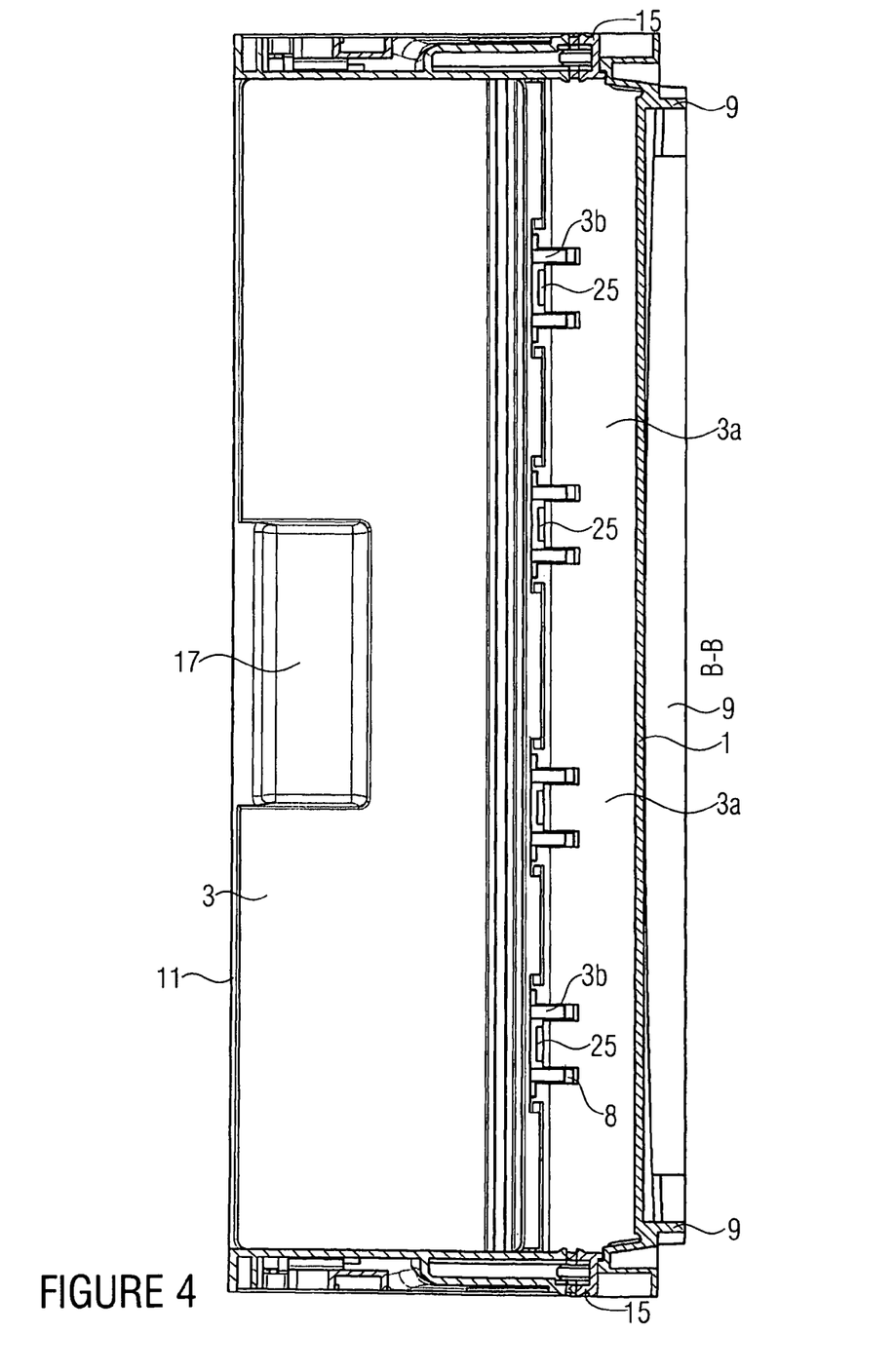
FIG. 4 shows a longitudinal section B-B through the fish crate in accordance with FIG. 2.
Figure 5:
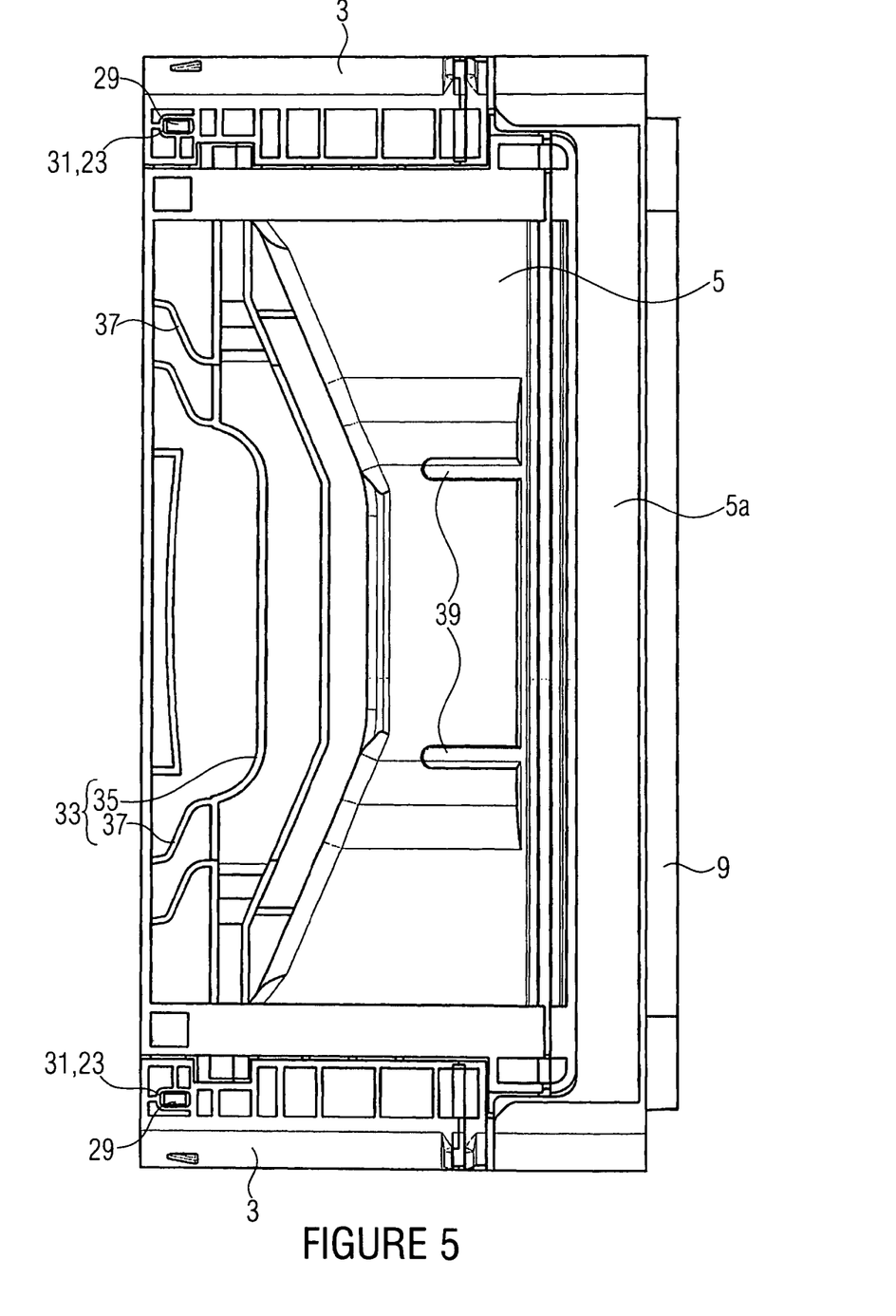
FIG. 5 shows a side view (enlarged in relative terms) of a short side part of the fish crate in accordance with FIG. 1.
Figure 6:
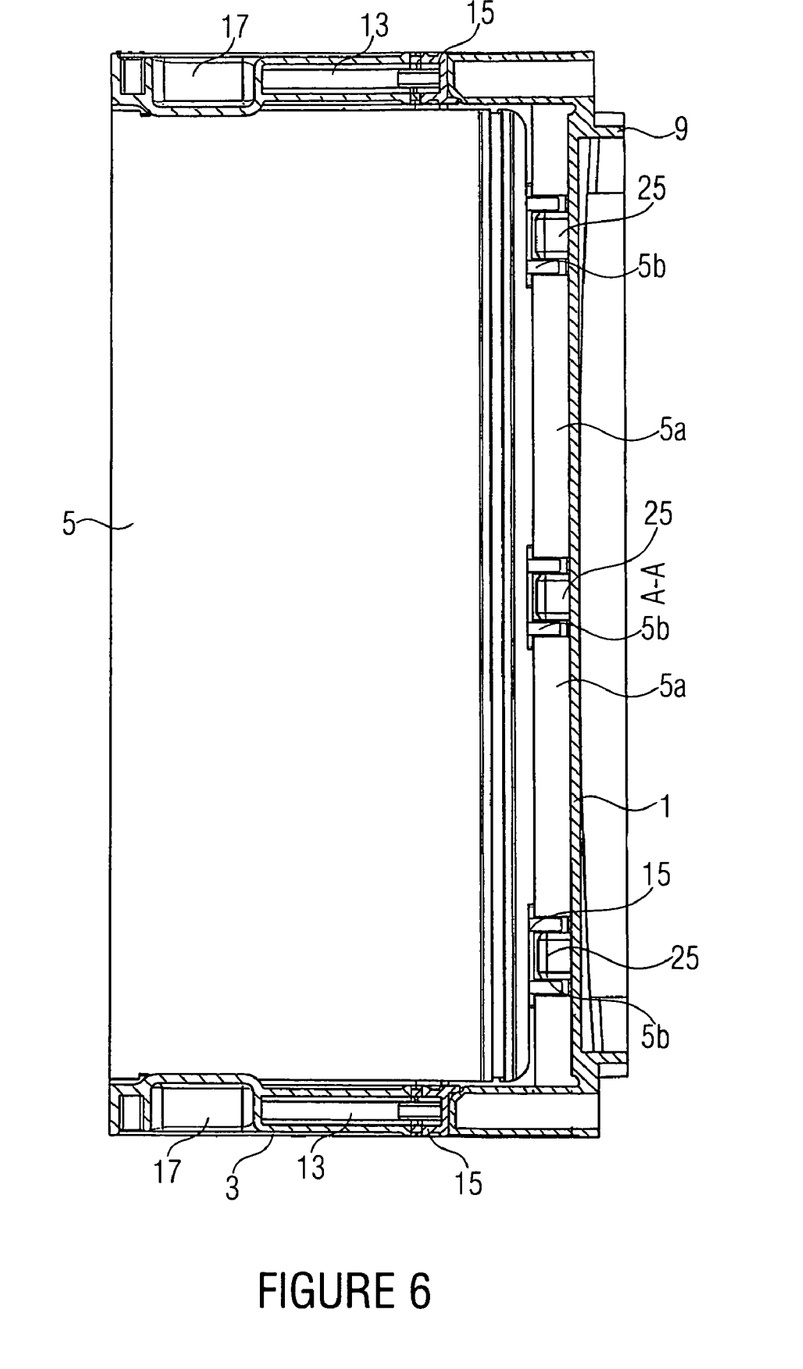
FIG. 6 shows a cross-section A-A through the fish crate in accordance with FIG. 2.
Figure 7:
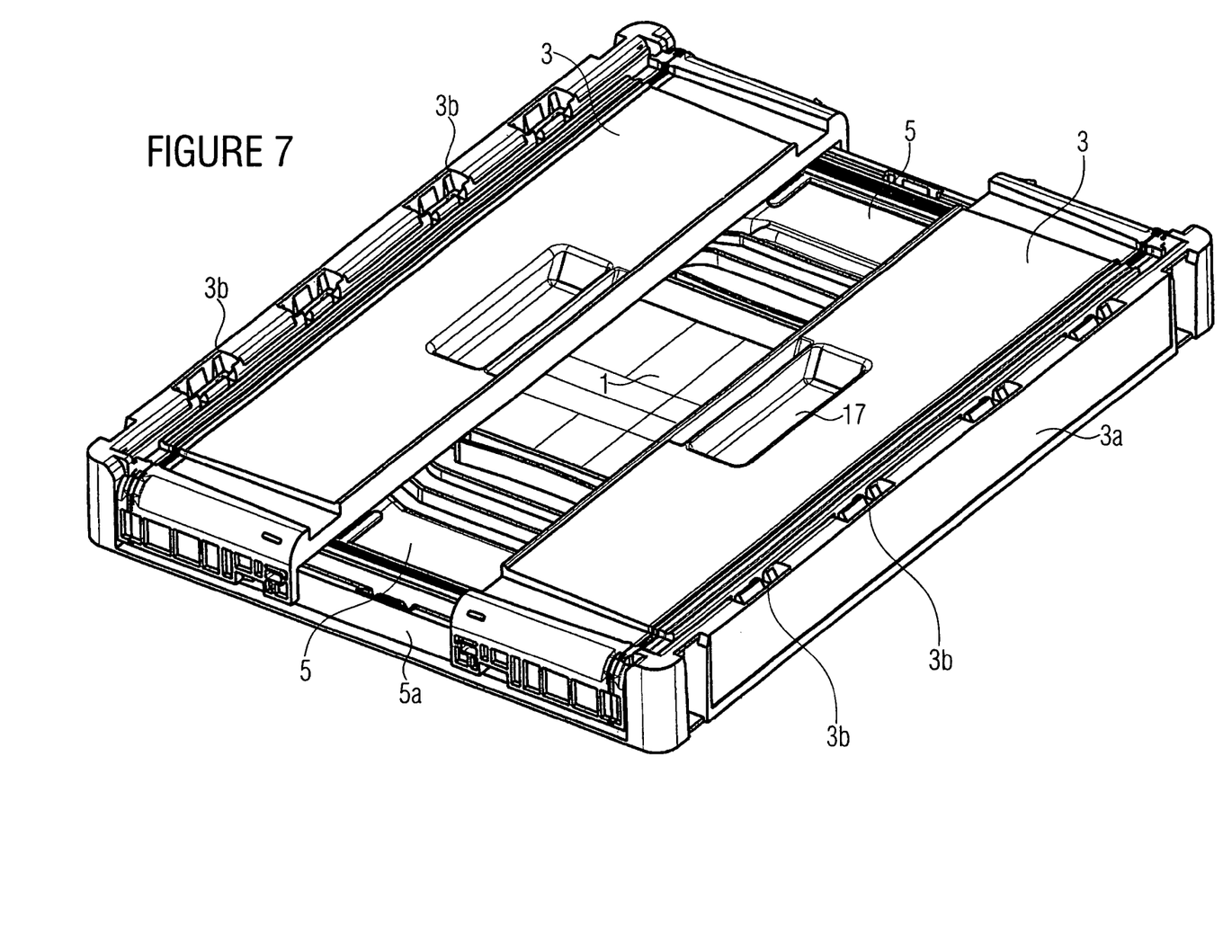
FIG. 7 shows a perspective view of the fish crate as in FIG. 1, but with all of the side walls folded up.
Figure 8:
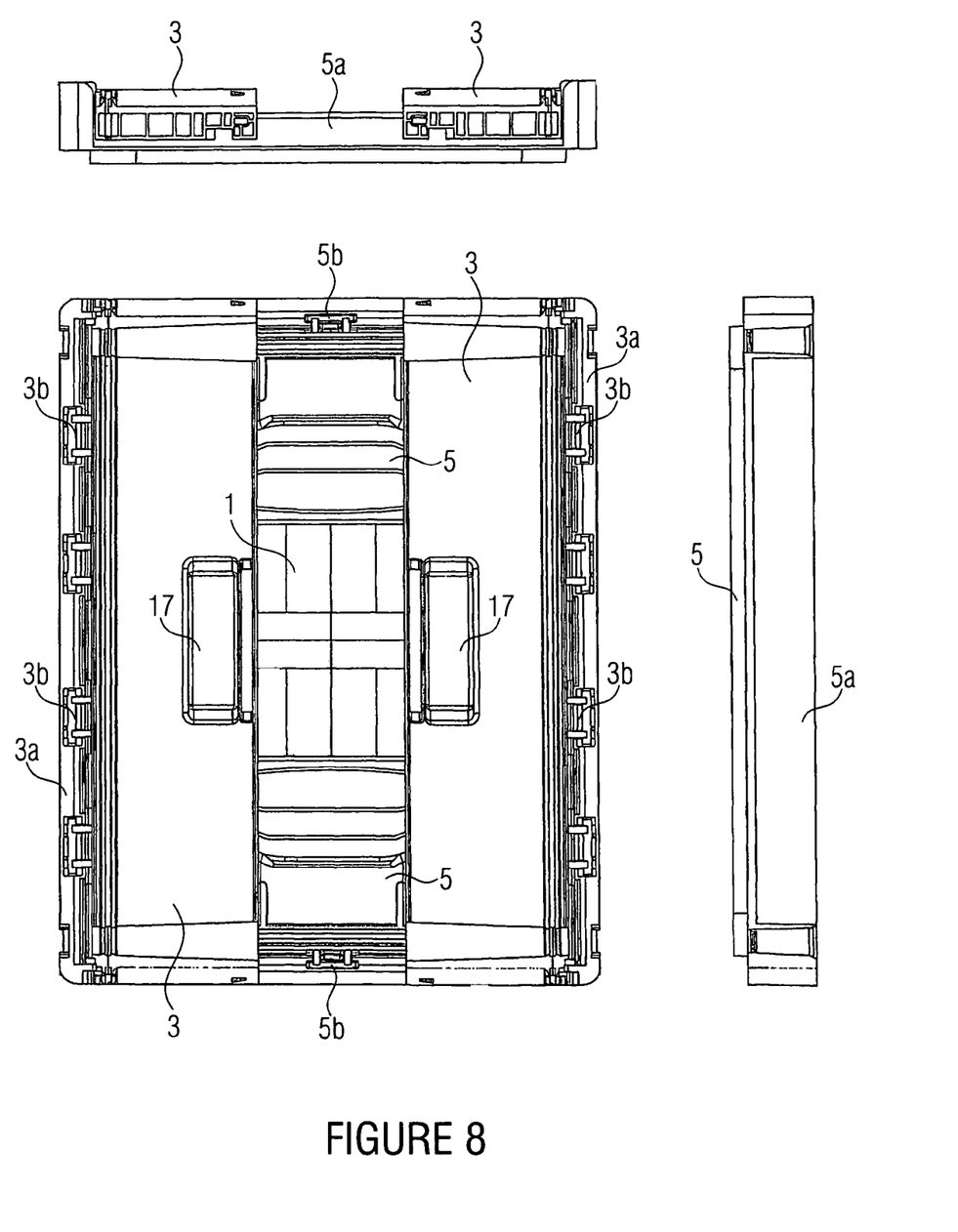
FIG. 8 shows a plan view, a longitudinal side view and a transverse side view of the folded-up fish crate in accordance with FIG. 7.

At the strips 3a, 5a which are slightly upright, the base tray 1 supports hinge means 3b, 5b to which the side walls 3, 5 may be hinged. At its bottom surface, the base tray 1 further supports a circumferential rectangular bulge 9 which serves to stack fish crates of the same kind (best to be seen in FIGS. 4 and 6). The rectangular bulge 9 of a crate stacked higher up fits onto the rectangular top 11 of a lower fish crate with upright side walls 3, 5.

Except for the lateral discharge openings 7 described, the base of the base plate 1 is implemented to be closed. The closed base implementation 1 prevents both dripping of liquid from a fish crate which is located higher up onto a fish crate located below it; but it also serves to cool and thermally insulate its contents. The closed implementation of the base 1 may be simple, as in the embodiment depicted (from the point of view of weight saving), but it may also be double-walled (from the point of view of insulation).

Next, the side walls 3, 5 will be described which—as has already been explained—are hinged, via hinges 3b, 5b, to the base tray 1 at the proper height so as to allow folding inward in a problem-free manner for return transport or storage in a cleaned state. For transport, the long side walls 3 are initially folded open. They are implemented to be closed and essentially doubled-walled. The double-walled wall implementation 3 comprising a trapped air cushion 13 is instrumental in increasing the heat transition resistance from the ice-cooled goods which are being transported to the ambient temperature. The double-walled nature is achieved, when the plastic is injection-molded, by a suitable core (not shown). After the withdrawal of this injection-molding core, a footing 15 is welded on while hot, whereby the air cushion 13 is closed.

Within the context of the double-walled implementation, a handle 17 for handling the fish crate is also sunk in at each longitudinal side 3. For reasons of thermal insulation, however, this handle 17 is not provided with an open handhold as usual, but for its part is true to the principle of the closed wall implementation.

Finally, the long side walls 3 are provided, in the direction of the vertical joint seams 19, with stops 21 on the one hand, and with latching recesses or traps 23 on the other hand, i.e. with locking devices for the short side walls 5.

The short side walls 5 also comprise hinges 5b for connection to the base tray, which hinge joints 5b result from eyes 25 of the side walls latching into the shoulder portions 5a of the base 1. In the embodiment, a short side wall 5 comprises three such connecting eyes 25, while a long side wall 3 in the embodiment comprises four such connecting eyes 25 in the direction of the base 1.

In the upright state, the vertical joint seams 19 are secured by stop strips 27 of the short side parts 5 in combination with a centering pin 29 of the short side parts 5, the centering pins 29 engaging into small openings 31 within the stops 21 of the long side parts. A so-called liftlock closure 33 as is known in the above references is used as a lockable and unlockable closure depicted in a darker color in the embodiment. Lifting of the fastening 35 against the spring force of four plastic lugs 37 unlocks the closure. In addition, a locking bolt of the short side wall 5 and the corresponding trap 23 of the long side wall 3, however, are implemented such that they elastically yield at a stop position if the short side wall 5 is knocked in. In practice, such a knocking-in treatment on the part of the logistics company is to be expected.

Finally, the short side walls 5 also comprise insertion clamps 39 into which a sign made of paper, cardboard or plastic may be inserted in order to mark and designate the crate and its contents.

In the upright orientation, the top 11 of the four side walls 3, 5 is flat and suited for having a further crate of the same design stacked on top of it. The shaping at the stacking point (top edge 11 or bulge 9 of the base plate 1) is particularly well suited for each collapsible container being covered by a plastic foil (not depicted) as is known in the above references. The stackability of the collapsible container is not impaired by this being covered, which increases thermal insulation. The connection of the foil to the top edge 11 of the container is accomplished in a known manner by sealing, gluing or welding. After use, this foil may be readily removed before the container is emptied of the transported goods, subsequently cleaned, folded up and stacked and stored for further use or returned. Occasionally it may also suffice for only the topmost container of a stack to be covered with a foil.

The shaping of the collapsible container, protected here, for transporting fresh fish or the like, in particular ice-cooled goods, is essentially created in that an injection-molding tool (not depicted) determines the shape of a major part of the plastic container. In particular the base tray with its openings 7 and hinge shoulders 3b, 5b is manufactured by plastic injection molding. The side parts 3, 5, in particular their double-walled implementations, are also manufactured by means of plastic injection molding using an injection-molding core, the footing 15 mentioned, which supports the hinges 3b, 5b, subsequently being welded onto the double wall once the injection-molding core has been withdrawn. For the short side part 5, the footing 15 is also welded onto the double wall, and then the liftlock closure 33, which was manufactured separately, is used in a sprung manner.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A collapsible container for transporting fresh fish or similar ice-cooled goods,
the collapsible container including side walls and a base, wherein
the side walls and/or the base comprise a double-walled structure comprising a closed air cushion,
lateral openings arranged to permit passage of liquid are provided in the base, the base being arranged to permit liquid from the base of the collapsible container to be drained to outside such that the liquid will be prevented from draining out from the base into another container arranged below the collapsible container when the collapsible container is stacked upon the another container, and
a liftlock closure arranged to lock the side walls in an upright orientation, the liftlock closure being arranged to be released without causing any damage by movement of the liftlock closure or by knocking into at least one of the side walls.

2. The collapsible container as claimed in claim 1, wherein only the side walls, but not the base, comprise the double-walled implementation comprising the closed air cushion.

3. The collapsible container as claimed in claim 1, wherein the double-walled implementation comprising the air cushion is created by a core in injection molding.

4. The collapsible container as claimed in claim 3, wherein the air cushion is closed by a welded-on footing.

5. The collapsible container as claimed in claim 1, wherein additional openings are provided adjacent to hinges which are arranged to join the base and the side walls in a foldable manner.

6. The collapsible container as claimed in claim 1, wherein the openings may be closed off as desired so as to prevent draining of liquid.

7. The collapsible container as claimed in claim 1, wherein the collapsible container is stackable such that a collapsible container of the same type may be placed upon it in a non-slip manner.

8. The collapsible container as claimed in claim 1, wherein the side walls are closed and/or the base is closed.

9. The collapsible container as claimed in claim 1, wherein the side walls may be folded onto the base.

10. The collapsible container as claimed in claim 1, wherein
the base has a tray shape including vertical strips;
hinges to which the foldable side walls are hinged are provided at the vertical strips;
the lateral openings are spaced away from the hinges; and
the base comprises, apart from the lateral openings and/or additional openings in the area of the hinges, a closed base design.

11. The collapsible container as claimed in claim 10, wherein the lateral openings are arranged at four corners of the collapsible container and spaced away from the hinges.

12. A collapsible container for transporting fresh fish or similar ice-cooled goods,
the collapsible container being manufactured essentially by plastic injection molding of side walls and a base, wherein
the side walls and/or the base comprise a double-walled implementation comprising a closed air cushion,
openings for the passage of liquid are provided in the base area, and
a liftlock closure is provided to mutually lock the foldable side walls in an upright orientation, and that the liftlock closure may be released without damage both by the known liftlock movement and, alternatively, by knocking in the side wall.

13. A collapsible container comprising:
side walls and a base; wherein
the side walls and/or the base comprise a double-walled structure comprising a closed air cushion;
openings arranged to permit passage of liquid are provided in the base; and
a liftlock closure is provided to lock the side walls in an upright orientation, the liftlock closure being provided such that it may be released without causing damage by movement of the liftlock or, alternatively, by knocking into at least one of the side walls.

* * * * *